United States Patent [19]

Selander et al.

[11] E Re. 29,770

[45] Reissued Sep. 19, 1978

[54] MANUFACTURE OF FIBERBOARD ACCORDING TO THE WET METHOD WITH CLOSED BACKWATER SYSTEM

[75] Inventors: Stig Daniel Selander, 5 Fredrikshovsgatan, 115 22 Stockholm, Sweden; Bernard Marechal, Casteljaloux; Corrado D'Andrea, Arpajon, both of France

[73] Assignees: Isorel S.A., Puteaux, France; Stig Daniel Selander, Stockholm, Sweden

[21] Appl. No.: 824,853

[22] Filed: Aug. 15, 1977

Related U.S. Patent Documents

Reissue of:

[64] Patent No.: 3,966,540
Issued: Jun. 29, 1976
Appl. No.: 504,739
Filed: Sep. 10, 1974

[30] Foreign Application Priority Data

Sep. 14, 1973 [SE] Sweden ..... 7312580

[51] Int. Cl.[2] ..... D21C 3/00

[52] U.S. Cl. ..... 162/13; 162/161; 162/190

[58] Field of Search ..... 162/13, 161, 190

[56] References Cited

U.S. PATENT DOCUMENTS

| | | | |
|---|---|---|---|
| 1,954,800 | 4/1934 | Cyr et al. | 162/190 |
| 3,627,630 | 12/1971 | Gagnon | 162/100 |
| 3,674,457 | 7/1972 | Wolfson | 162/190 |
| 3,871,952 | 3/1975 | Robertson | 162/190 |
| 3,907,630 | 9/1975 | Selander | 162/190 |

*Primary Examiner*—S. Leon Bashore
*Assistant Examiner*—William F. Smith
*Attorney, Agent, or Firm*—Eric Y. Munson

[57] ABSTRACT

An improved method for the manufacture of wood fiberboard according to the wet system with a closed white water system includes the steps of drying the incoming lignocellulose containing material, prior to the dilution step, to a dryness, or solid consistency, which is higher than the dryness of the wet lap or sheet before final drying to produce the fiberboard product. Formaldehyde is added to the resulting white water which is homogenized to atomize occurring precipitations through efficient agitation and dispersion prior to being recirculated for use for diluting the incoming fiber material. Thus, there is obtained an efficient closed white water system which results in a reduction of environmentally harmful discharge of polluted water as well as the production of fiberboard with enhanced appearance.

4 Claims, 3 Drawing Figures

MANUFACTURE OF FIBERBOARD ACCORDING TO THE WET METHOD WITH CLOSED BACKWATER SYSTEM

Matter enclosed in heavy brackets [ ] appears in the original patent but forms no part of this reissue specification; matter printed in italics indicates the additions made by reissue.

This invention relates to the manufacture, according to the wet method, of shaped bodies of lignocellulose-containing material to be denoted in the following by the common denomination fibreboard (of the hard, semi-hard or porous kinds) and comprising the following processing steps:

1. Production of fibres which
2. are suspended in backwater - white water - and
3. shaped to wet sheet or web by mechanical dewatering, consisting of drainage or compression or a combination thereof.
4. drying of the wet sheet by heat supply,
5. heat treatment and conditioning and
6. recycling of mechanically released water to the backwater system for preparing new fibre suspension.

In order to render possible in such a manufacturing cycle to operate with a wholly closed backwater system, thus without discharge of process water into the surroundings, the fibre material fed into the system must have a dry content which is substantially higher than that of the wet sheet before this sheet is dried finally to desired density by heat treatment accompanied by mechanical compression, or without such compression.

BACKGROUND OF THE INVENTION

In the manufacture of e.g. hard board, the pressure in the hot-pressing step is usually high and a dry content of about 50 per cent in the wet sheet often is required after the final mechanical squeezing out in order that the remaining water shall be removable by evaporation. Such high dry content prior to the evaporation can not be brought about in a conventional wet-forming machine, which usually does not render a higher dry content than 30 to 40%. An increase of the dry content from 30 to 55% can be brought about only in high-pressure equipment, e.g. flat presses, operated with necessary pressure, e.g. 50 to 75 kgs/cm$^2$. Therefore, this dewatering operation can be carried out as a separate pressing step prior to the hot pressing operation proper, or possibly, in a pressing portion mounted directly to the sheet forming machine. However, it is quite possible to effect the last mechanical squeezing out of water in the hot press if the drained-off water is collected and returned to the backwater system. Due to the high temperature in the hot press, this involves some inconveniences by generation of sirupy or resinous coverings on the fibre sheet or web.

As pointed out above, the entering wood fibres must have a considerably higher dry content than the wet sheet prior to the final drying step, if it shall be possible to form the wet sheet in a wholly closed backwater system. Therefore, in the manufacture of hard board, the dry content of the fibres prior to the suspension thereof must be brought up to 60–75%. A high dry content of the fibre material renders possible to add certain quantities of fresh water e.g. from pressurized waterproof chests and the like, without causing any excess of backwater.

When starting from very dry wood having a dry content of 70–80%, which can have been reached by storing or artificial drying of the wood material, it is possible to produce a fibre pulp having sufficient high dry content; normally, however, the wood has so high a moisture content or so much water must be supplied in the defibrating step that the dry content of fibre material becomes too low.

Of course, the fibre pulp can be dried in all known and suitable ways, but in order to ensure a constant and sufficiently high dry content of the fibre material, it is suitable to produce the pulp in accordance with the disclosure in the French patent No. 7210434, according to which the wood is defibrated in an atmosphere of saturated steam and pulp discharged from this treatment is dried continously to a dry content which can be varied within a wide range from e.g. 40 to 90% and usually 60 to 75%, and thereupon is suspended in circulating backwater, under addition, if desired, of some fresh water, and then formed and pressed or solely dried. By the drying of the fibre material to suitable dry content, fibreboard or slabs can be manufactured in a wholly closed backwater system without discharge of process water. In this way a method is obtained, against which no objections from the view point of perservation of nature can be raised.

Defibration under pressure and increased temperature is effected usually within a temperature range from 160° to 170° C. Under these conditions, the quantity of released organic material becomes relatively high, viz. 7 to 10%, and its content in the circulating backwater is increased gradually. Therefore, it is recommended to operate at a lower temperature within a range from 130° to 150° C and a short preheating time, in which way the release of organic material can be lowered and limited to 4 to 5%. Thereby, a backwater is obtained which has a lower concentration of organic substances dissolved therein. Nevertheless, it must be calculated with that the backwater will have a relatively high content of hydrolyzed hemicellulose, dextrines, low-molecular lignine and also resins. These various substances cause precipitations in the backwater and can produce spots on th finished board with a classing down of the quality of the board as an unwelcome consequence, and in addition increase the danger of fire in subsequent heat treatment of the pressed board or slab.

SUMMARY OF THE INVENTION

Surprisingly, it has now been proved possible to avoid generation of spots and danger of fire in a wholly closed backwater system by a homogenizing of the backwater and finely dispersing flocks and precipitations by effective agitation, provided that simultaneously formaldehyde is added to the backwater. This extremely important effect has been confirmed by operation on industrial scale. Thus, according to the invention, fibreboard free from spots and with an even colour can be produced in a wholly closed backwater system, provided that formaldehyde is admixed to the aqueous solution intermittently or continuously, and preferably in a quantity amounting to 0.02 to [0.2%] *0.5%* of the fibre weight. Flocks and precipitations already formed are smashed and finely dispersed so that a homogenous backwater is obtained. The homogenization is made simplest by insertion of effective stirrers or disperging apparatus into the backwater chests. The presence of the formaldehyde is decisive to cause the precipitations to become so to say innocuous. In operation of a closed backwater system at a temperature of 65° to 75° C or more, there is normally no risk of slime being formed, whereas such a risk exists at lower temperatures, e.g. in the range from 40° to 65° C. Within this last-mentioned temperature range, a formation of slime can only be controlled by addition of formaldehyde.

However, a low temperature of the backwater can under certain conditions be of great importance, e.g. when the object is to reduce the evaporation of steam during the forming step so as to improve the air and the working environment in the forming station which constitutes an advantage directly resulting from the treatment of the backwater suggested hereinbefore.

It is also possible to store the backwater treated in the way suggested here without danger of bacterial infection.

In order to improve the quality of the backwater, it is possible in parallel to the suggested treatment to filter the backwater or to treat it in a sludge centrifuge.

In order further to reduce the precipitations or sedimentations it is suitable to adjust the pH of the fibre suspension to between 3 and 4.5, usually between 3.6 and 4, by addition of suitable alkaline agents and thereafter to admix ions of Al and Fe for fixing released resins and other organic substances onto the fibre material.

Another advantage obtainable with a wholly closed backwater system consists in the feature that, when adding colour pigments, synthetic resins, waxes and/or fire proofing agents, e.g. various salts, one can operate with the lowest possible quantity of additives or, in case that an excess of additives is present, to avoid waste thereof.

The same method has during operation under factory conditions for longer periods of time proved also to be utilizable for manufacture of porous fibreboard, where hot pressing is not applied, but the whole water content of the wet sheet after forming is removed by evaporation in roller driers or similar apparatus. A condition for reaching this result is here also that the basic fibre material prior to its suspension has a dry content which is higher than the dry content of the wet sheet after forming and prior to final drying.

DESCRIPTION OF THE PREFERRED EMBODIMENTS

Figure 1:
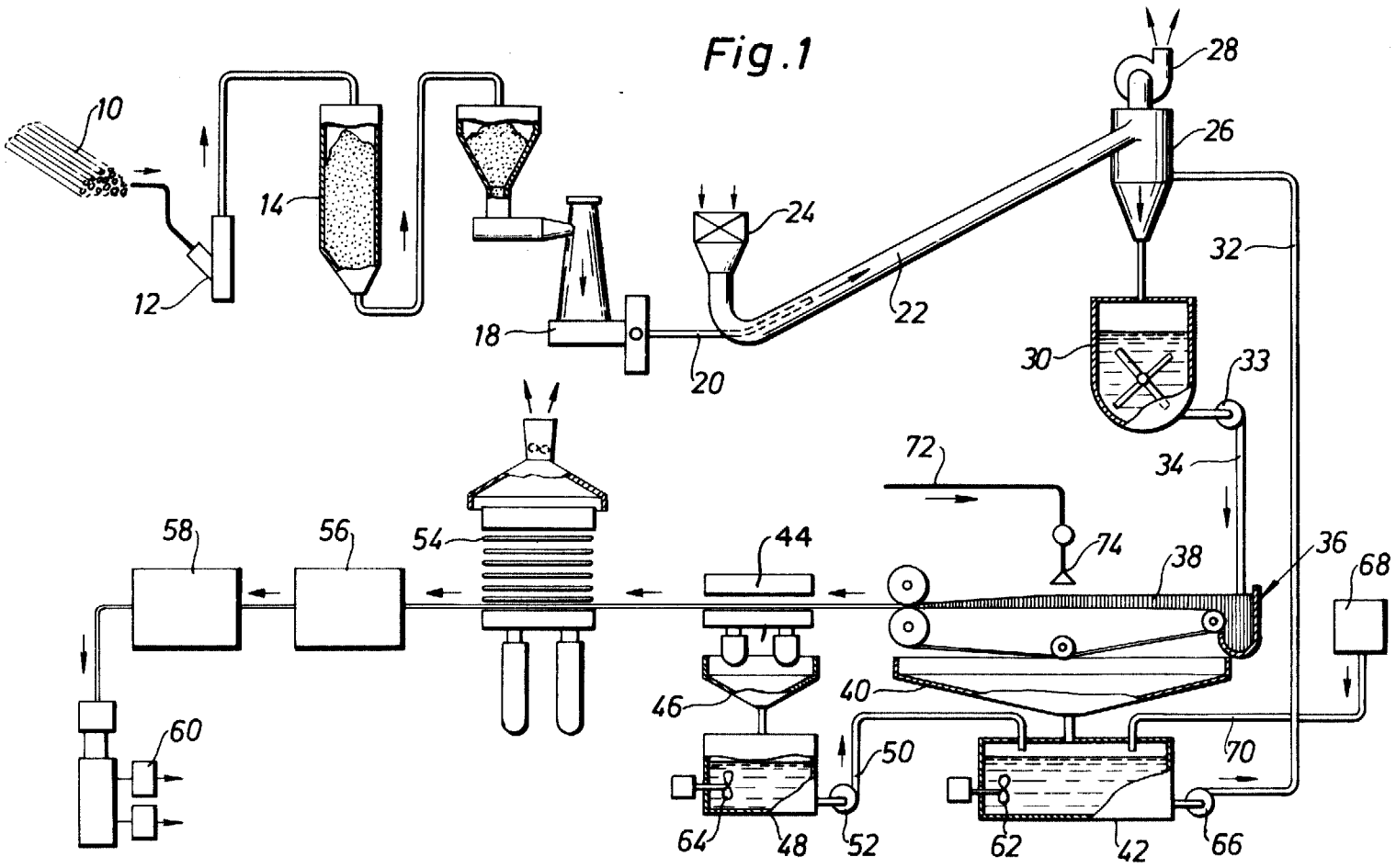

The invention will hereinafter be explained in greater detail with reference to flow diagrams representing three embodiments of the invention in the accompanying drawings as FIGS. 1 through 3. In the various figures, equivalent parts have been denoted by the same reference numerals.

From a supply of raw material, such as a stock 10 of wood, the starting material is conveyed to an apparatus 12 within which it is disintegrated, such as cut, into minor pieces, e.g. in the shape of chops or chips, which are conveyed to a bin 14 through a duct 16. From here, the chips are conveyed to a defibrating station 18, where they are defibrated or refined in one or several steps. The fine disintegration of the raw material into pulp can be effected either under atmospheric conditions or under increased pressure at increased temperature, preferably in steam atmosphere.

The pulp is now conveyed through a duct 20 into the interior of a drying station 22 which is passed by a gas, such as air, having increased temperature. The heating of said gas can be effected in a heat exchanger 24 by means of steam or hot water. It is also conceivable to produce the hot gas in a heat generator. The hot gases are sucked through the drying station 22 to a cyclone separator 26 by means of a fan 28, the pulp discharged from the defibrating station 18 through the conduit 20 being entrained and dried in the drying station to a dry content which is higher than that prevailing after the last mechanical drying step during the later part of the process as will be explained nearer later on in this description. The steam released by the drying process escapes from the cyclone separator 26 and the fan 28 into the surrounding atmosphere, whereas the dried pulp falls down into a pulp chest 30, while at the same time being brought into an aqueous suspension by means of backwater fed from a pipe 32 into either the cyclone separator or directly into the chest 30. The pulp suspension is pumped by means of a pump 33 and through a duct 34 to a forming station 36 for slab blanks, said station being operative in known manner by dewatering such as drainage through a wire cloth 38 movable along an endless path. Hereunder, the main part of the backwater serving as propellent liquid is separated off and is collected via a trough 40 in a backwater chest 42.

In the embodiment according to FIG. 1, the board blanks are subjected to additional mechanical forcing out of water in liquid state in a preliminary press 44. The backwater discharged therefrom is collected via a trough 46 in a preferably separate backwater chest 48, which through a pipe 50 and a pump 52 is in connection with the main chest 42.

The final drying of the board sheets or slabs is performed thereafter in a pressing apparatus 54 applying heat and pressure in combination. Ahead of this pressing apparatus the dry content has been lowered so much, such as down to between 50 and 55%, for example, that all remaining water escapes in steam phase. The process line finally includes in a manner known per se a heat treatment station 56, a conditioning station 58 and a saw-cutting station 60.

According to the invention, there is provided in the backwater chest 42 and/or the backwater chest 48 one or several motor-driven agitator or stirrer means 62 or 64, respectively, which keep the backwater together with solid substances following therewith under continuous strong agitation so that the backwater is homogenized and precipitations and/or formation of flocks in the chests are counteracted effecively. Thus, when the backwater by a pump 66 is recycled through the pipe 32 into the cyclone separator 26 or the chest 30 for formation of fresh aqueous suspension of predried pulp, the substances dissolved into, or admixed to, the backwater will be distributed homogeniously in the suspension, when this suspension is propelled to the forming station 36. Furthermore, formalin, e.g. formaldehyde in aqueous solution, is supplied from a tank 68 through a pipe 70 to the chest 42 in a suitable dosed quantity as determined above. By the addition of formaldehyde, the substances following with the backwater are decomposed or transformed, so that they do no harm or are noticeable in the final board. The strong agitation in the chest 42 makes sure that the formalin also will be distributed uniformly in the backwater.

Preferably, the backwater chest 42 alone or together with, the backwater chest 48 have so great a volume that there is room for the whole quantity of backwater circulating in the system so that even in case of sudden interruption of the operation no discharge of backwater into a receiver need occur.

In the drying station 22, so much water is removed from the pulp that its dry content ahead of the hot press 54 is sufficiently low to allow removal of water in the hot press solely in steam phase. As an example, it may be mentioned that, if the dry content ahead of the hot press is of the order of magnitude of 50 to 55%, it can be behind the drying station 22 from about 65 to about 75%. Therefore, it is also possible to some extent add fresh water e.g. through a pipe 72 to a nozzle or sprinkling device 74 located adjacent the forming station 36 i.a. for improving the surface properties of hardboard. If desired, the fresh water may contain chemicals which are desired to be contained in the final product. As will be understood from the preceding explanation, the backwater is kept in a wholly closed system so that no escape or discharge to the environment need occur.

Figure 2:
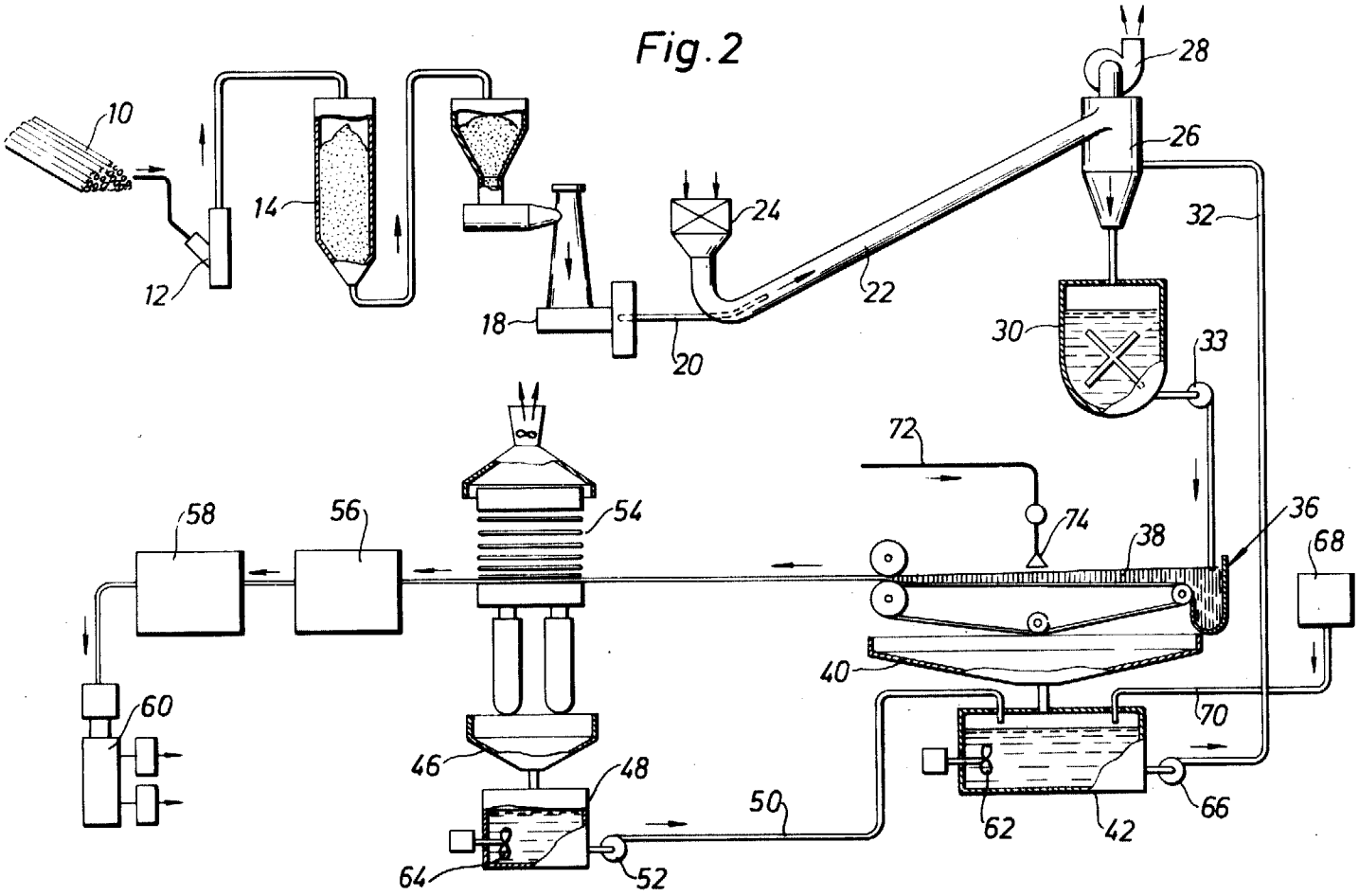

The embodiment according to FIG. 2 differs from the preceding one by the feature that the preliminary press 44 has been dispensed with, the press 54 taking care of both the final mechanical separation of water and the final drying by driving off water in steam phase. The water is collected in the backwater chest 48 which is equipped with agitator means 64 and through the pipe 50 and the pump 52 is in connection with the main chest 42. In this case, the board blanks when entering the hot press 54 may have a dry content of between 30 and 35%, thus a lower one than in the preceding case, which means that the portion of water forced out mechanically in the press 54 is approximately equally great as expelled by the press 44 according to the preceding embodiment.

Figure 3:
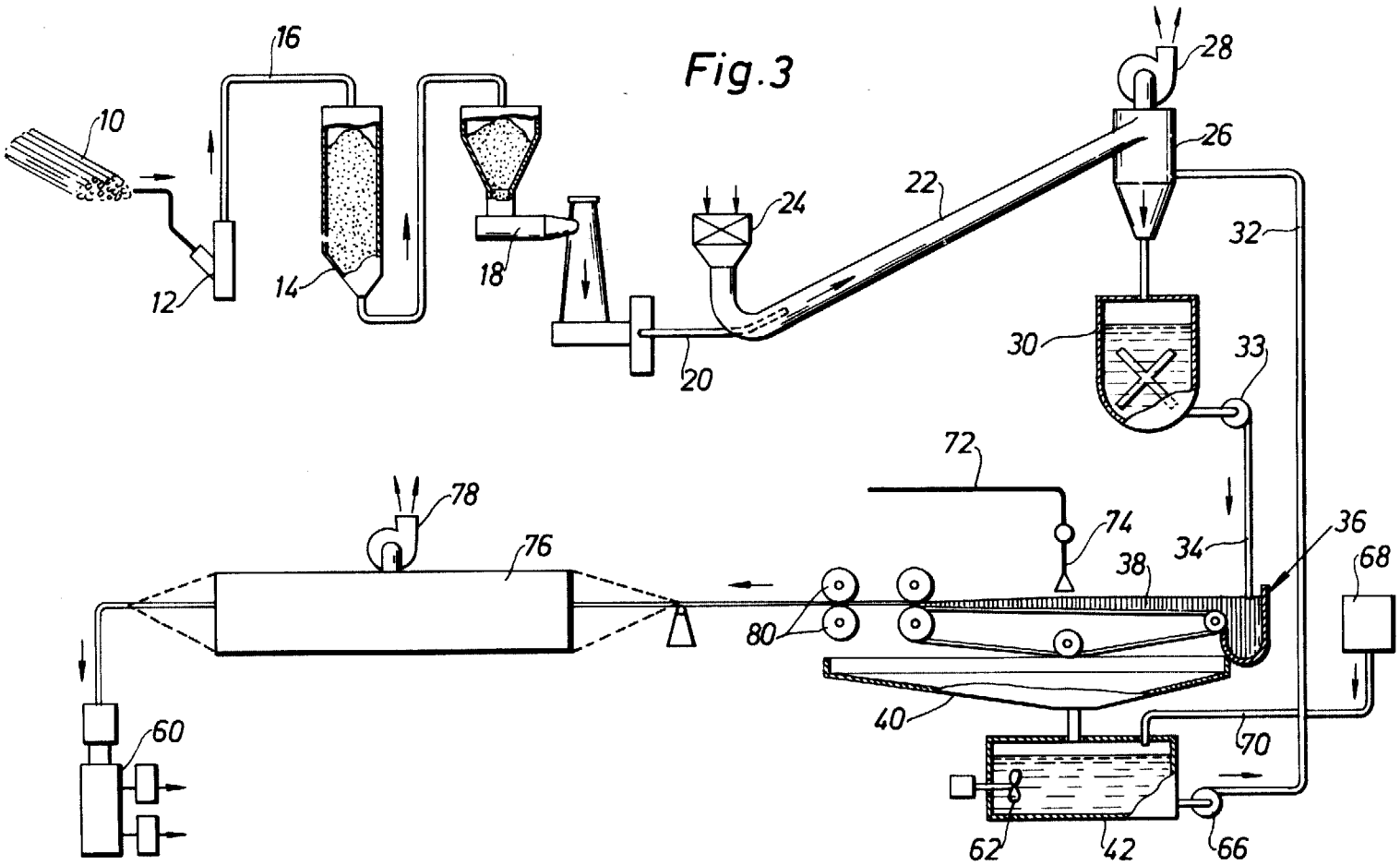

The embodiment illustrated in FIG. 3 is especially intended for manufacture of porous board for which reason also the hot press 54 has been dispensed with. The final drying by heat is effected e.g. in a roller dryer 76 equipped with a suction fan 78 for the steam formed during the drying operation. In this case, there may be provided behind the forming station 36 one or several pairs of press rollers 80 which thus constitute a last station in the mechanical expelling of water. In this case, the dry content of the board blanks prior to the hot drying means may be e.g. 40 to 45 per cent, which values are below and preferably substantially below the dry content of the fibre pulp immediately behind the station 22 for preliminary drying.

Obviously, the invention is not limited to the embodiments shown, but may be varied in many respects within the scope of the basic idea thereof.

We claim:

1. In the method of manufacturing wood fibreboard according to the wet system with closed white water system including defibrating lignocellulose material, diluting the defibrated material in water serving as the transporting medium, forming wet sheets from the diluted pulp, mechanically separating white water obtained from the formation of wet sheets and recirculating it to the dilution stage and final drying by evaporation of water from the wet sheets, the production of fibreboard having enhanced appearance while maintaining a closed white water system with reduced discharge of pollutants to the environment including drying the incoming lignocellulose material, prior to the dilution step, to a [dry content from 60 percent to 75 percent] *dryness* which is higher than the dryness of the wet sheet prior to the time it enters the final drying stage, the improvement comprising adding formaldehyde to the white water, homogenizing the white water containing said formaldehyde to a degree such that occurring precipitations are atomized prior to using it for dilution of incoming fibre material.

2. An improved method according to claim 1, in which the homogenization of the white water occurs in the white water chests.

3. An improved method according to claim 1, in which the homogenization is brought about by agitation and dispersion through the use of a stirrer.

4. An improved method according to claim 1, wherein the formaldehyde is added in the amount of 0.02–0.5 percent based on the fibre weight.

* * * * *